(12) United States Patent
Schaffer et al.

(10) Patent No.: US 7,765,867 B2
(45) Date of Patent: Aug. 3, 2010

(54) TRANSMITTER FOR PROVIDING INVENTORY OR INVENTORY TRANSFER INFORMATION ON A PRODUCT IN A CONTAINER

(75) Inventors: Joseph A. Schaffer, Greenwood, IN (US); Craig McIntyre, Greenwood, IN (US); Dieter Schmidt, Nesselwang (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 680 days.

(21) Appl. No.: 11/284,850

(22) Filed: Nov. 23, 2005

(65) Prior Publication Data

US 2006/0170543 A1 Aug. 3, 2006

Related U.S. Application Data

(63) Continuation-in-part of application No. 10/683,587, filed on Oct. 14, 2003, now abandoned.

(51) Int. Cl.
*G01F 23/00* (2006.01)

(52) U.S. Cl. .................................................. 73/292

(58) Field of Classification Search ............... 73/304 R, 73/291, 292
See application file for complete search history.

(56) References Cited

U.S. PATENT DOCUMENTS

| 5,138,265 A * | 8/1992 | Kawamura et al. .......... 324/535 |
| 6,281,801 B1 * | 8/2001 | Cherry et al. ............... 340/605 |
| 6,336,362 B1 * | 1/2002 | Duenas ....................... 73/313 |
| 2004/0140814 A1 * | 7/2004 | Bletz et al. .................. 324/644 |
| 2004/0245444 A1 * | 12/2004 | MacDougall .......... 250/231.19 |

* cited by examiner

*Primary Examiner*—John Fitzgerald
(74) *Attorney, Agent, or Firm*—Bacon & Thomas, PLLC

(57) ABSTRACT

A transmitter for providing inventory or inventory transfer information on industrial sites is described, for measurement of mass (M), weight (W), volume (V), level (L) and/or density (p) of a product (1) in a vessel (3) comprising: a level sensor (5), comprising: a conductive probe (9) extending into the vessel (3), means (11, 13) for generating and sending short electromagnetic pulses (S) down the probe, means (15) for reception of echoes (E) of the pulses (S) reflected at a surface of the product (1), means (17) for determining a time of flight (t) needed for a pulse (S) to travel down the probe (9) and its echo (E) to return, a pressure sensor (7), mounted on the probe (9), and a signal processing unit (45) for determining mass (M), weight (W), volume (V), level (L) and/or density (p) based on measurement signals supplied by the level sensor (5) and the pressure sensor (7).

7 Claims, 3 Drawing Sheets

TRANSMITTER FOR PROVIDING INVENTORY OR INVENTORY TRANSFER INFORMATION ON A PRODUCT IN A CONTAINER

This is a continuation-in-part of U.S. patent application Ser. No. 10/683,587 which was filed on Oct. 14, 2003.

BACKGROUND AND SUMMARY OF THE INVENTION

The present invention relates to a transmitter.

In many branches of industry, products are stored in vessels, for example in tanks or containers. Suppliers supply the product to the vessel and users obtain it from the vessel. Since industrial products can be very expensive complex inventory systems are used to account for in and out going product.

A product received from a supplier may be valued in volume (i.e. liters or gallons) when delivered and valued as a weight (i.e. kilograms or pounds) as plant inventory. The reconciliation of incoming product value and storage value can result in financial losses if not properly managed. As bulk supply chains become more collaborative, product within a given vessel may have more than one owner. Tracking product inventory accurately becomes more important. Suppliers and users do not always have the appropriate volumetric or mass flow measurement devices on site to account for usage. If platform scales are not available at the delivery site to weigh an incoming bulk liquid delivery truck, valuation of the delivered bulk liquids given by the supplier is assumed to be correct by the user. If a custody transfer station is not available at the delivery site, a valuation of the delivered bulk liquids given by the supplier is assumed to be correct by the user.

At present individual measurement devices are used to get information on inventory of products in a tank.

Pressure measurement devices mounted on a sidewall of the vessel or on a cable or rod extending into the vessel determine hydrostatic pressure exerted on the device by the product above it. Algorithms are used to convert this hydrostatic pressure into level or volume values. Level or volume values are not fully corrected for density or temperature changes. Temperature measurement devices mounted on a sidewall of the vessel or inside the vessel on a cable or rod are used to determine the temperature of the liquid. Algorithms are used to correct the level or volume information for temperature variation. This requires another opening in the tank to accomplish.

Devices mounted on a sidewall of the vessel can be subject to wider temperature differences between product and ambient temperatures. In addition externally mounted pressure sensors are subject to tank wall movements, when the tank bulges out when filled, that can introduce significant errors.

A position of a surface of the product within the vessel can be determined with top mounted electronic measuring devices using capacitance, ultrasonic, radar, laser technologies. Algorithms are used to convert the position of the liquid into inventory level or volume information. Again, these values are not fully corrected for density or temperature changes. Often an additional pressure transmitter is used to calculate mass or density corrected volume. These hybrid solutions require multiple tank openings to accomplish.

Determination of the mass or weight of a liquid in a pressurized tank may require the addition of another pressure sensing device to account for a head pressure inside the tank above the product.

Determination of the density of the product is required by some algorithms to calculate corrected volume or level. In order to determine the density an additional pressure sensing device is mounted some known distance above the hydrostatic pressure measurement device. Density is then determined based on the distance between the two devices and the difference in pressure at their respective locations.

Another method to determine product inventory within a tank is to use mechanical floats or displacers mounted on a cable or rod inside the tank. The position of these floats is used to determine the level of the liquid. Magnetostrictive, resistance or cable tension sensing technologies are used to determine the position of the float. An additional displacer may be used to detect the density of the liquid at some point below the level measurement. Mechanical floats and displacers often require significant maintenance and are subject to material buildup errors. They often require physical entry into a tank to repair.

Load cell and strain gauge sensors are used to determine the weight of product in a tank. It is not always possible to install such sensors due to technical limitations and high installation cost.

More recently time of flight radar techniques have been used to determine the position of the surface of a product in a tank. Corresponding level measurement devices comprise a conductive probe that extends into the vessel. Microwave energy pulses are transmitted via a coupling, for example a launch plate down the probe. Some energy is reflected by the surface and returned back up the probe. A transit time from launch pulse launch to return can be used to calculate the position of the product surface.

Current practice is to use current loops to convey each individual measurement value from each measurement device to a programmable logical controller (PLC), a distributed control system (DCS) or other calculation device to perform the algorithms required to scale, compensate and correct the inventory information. Each measurement transmitter, its installation and wiring, adds cost.

If wireless technology is employed continuous power consumption from each transmitter can be over 0.5 watts.

Often process control measurement transmitters are employed in inventory measurement applications. The update times for each transmitter often exceed one second increasing power consumption for each device used. Inventory applications generally need to provide periodic, timed or event based information.

In the petroleum industry additional requirements need to be fulfilled. The American Petroleum Institute (API) defines the practice of measuring petroleum products in terms of corrected volume. The liquid position and liquid temperature at one or more points is used to calculate the inventory volume at a reference temperature using well known algorithms. Direct mass or weight measurement approaches are not generally used. There is increasing interest in using mass and/or weight determined values of petroleum products however, the current practices do not broadly support development of this information.

Floats and displacer gauging systems use mechanically moving components and sensors to measure level, temperature and density of products.

Radar gauges often combined with externally mounted temperature sensors are used to determine corrected level and volume.

Hydrostatic tank gauging systems use up to three externally mounted pressure transmitters, a temperature transmitter and a calculation box to calculate mass and sometimes density.

Hybrid systems use a top mounted radar gauge to determine level and externally mounted temperature transmitters and sometimes externally mounted pressure transmitters. A calculation box is installed to calculate mass, corrected volume and sometimes density.

Various digital buses generally of a proprietary design are used to convey the level, temperature and sometimes pressure information to the calculation box for volume correction and then to an inventory reporting and/or management system. Various types of converter boxes are used to transform one digital protocol into another at some significant expense when replacement of measurement technologies and/or suppliers are integrated into existing installations.

It is an object of the invention to provide a transmitter for providing inventory or inventory transfer information on industrial sites.

To this end the invention comprises a sensor apparatus for measurement of mass, weight, volume, level and/or density of a product in a vessel comprising:
  a level sensor, comprising:
    a conductive probe extending into the vessel,
    means for generating and sending short electromagnetic pulses down the probe,
    means for reception of echoes of the pulses reflected at a surface of the product,
    means for determining a time of flight needed for a pulse to travel down the probe and its echo to return,
  a pressure sensor,
    mounted on the probe, and
  a signal processing unit for determining mass, weight, volume, level and/or density based on measurement signals supplied by the level sensor and the pressure sensor.

According to a preferred embodiment, the transmitter comprises at least one temperature sensor, integrated in the probe.

According to a preferred embodiment, the transmitter comprises a communication interface for reception and/or delivery of information to a user, a supplier and/or a control unit.

According to a preferred embodiment, the transmitter comprises a totalizer, for totalizing supplies or withdrawals of the product.

According to a preferred embodiment, the transmitter comprises a monitor, for monitoring unauthorized supply or withdrawal of product and leakage.

According to a preferred embodiment, the transmitter comprises a device for determining a physical position of the transmitter.

According to a preferred embodiment, the transmitter comprises an integral server for supporting communication with at least one Information Technology Network.

According to a preferred embodiment, the transmitter comprises a power supply to provide energy for the level sensor, the pressure sensor, the temperature sensors, the means, and the signal processing unit.

According to a preferred embodiment, the transmitter comprises at least one optical fibre as temperature sensor, which is integrated in the probe.

According to a preferred embodiment, the transmitter comprises at least one optically analysing pressure sensor.

The transmitter according to the invention provides multiple inventory information variables from one measurement device. Compensation and correction of any of these output values can be performed by the transmitter itself. The need for external programmable logical controllers (PLC), distributed control systems (DCS) or other calculation boxes to provide correct inventory information is eliminated. Pressure and temperature sensors are incorporated on the same probe used for time domain reflectometry.

The sensors are mounted internal to the vessel so they will generally be at the same temperature as the product.

The transmitter is able to provide level, weight, volume and/or density inventory information over time to inventory logistics operations that use this information to determine if a product delivery is required or that there is room to receive a delivery. The transmitter can simultaneously provide the information to both suppliers and users.

The invention and its advantages are explained in more detail using the figures of the drawing, in which one exemplary embodiment is shown. The same reference numerals refer to the same elements throughout the figures.

DETAILED DESCRIPTION OF THE DRAWINGS

Figure 1:
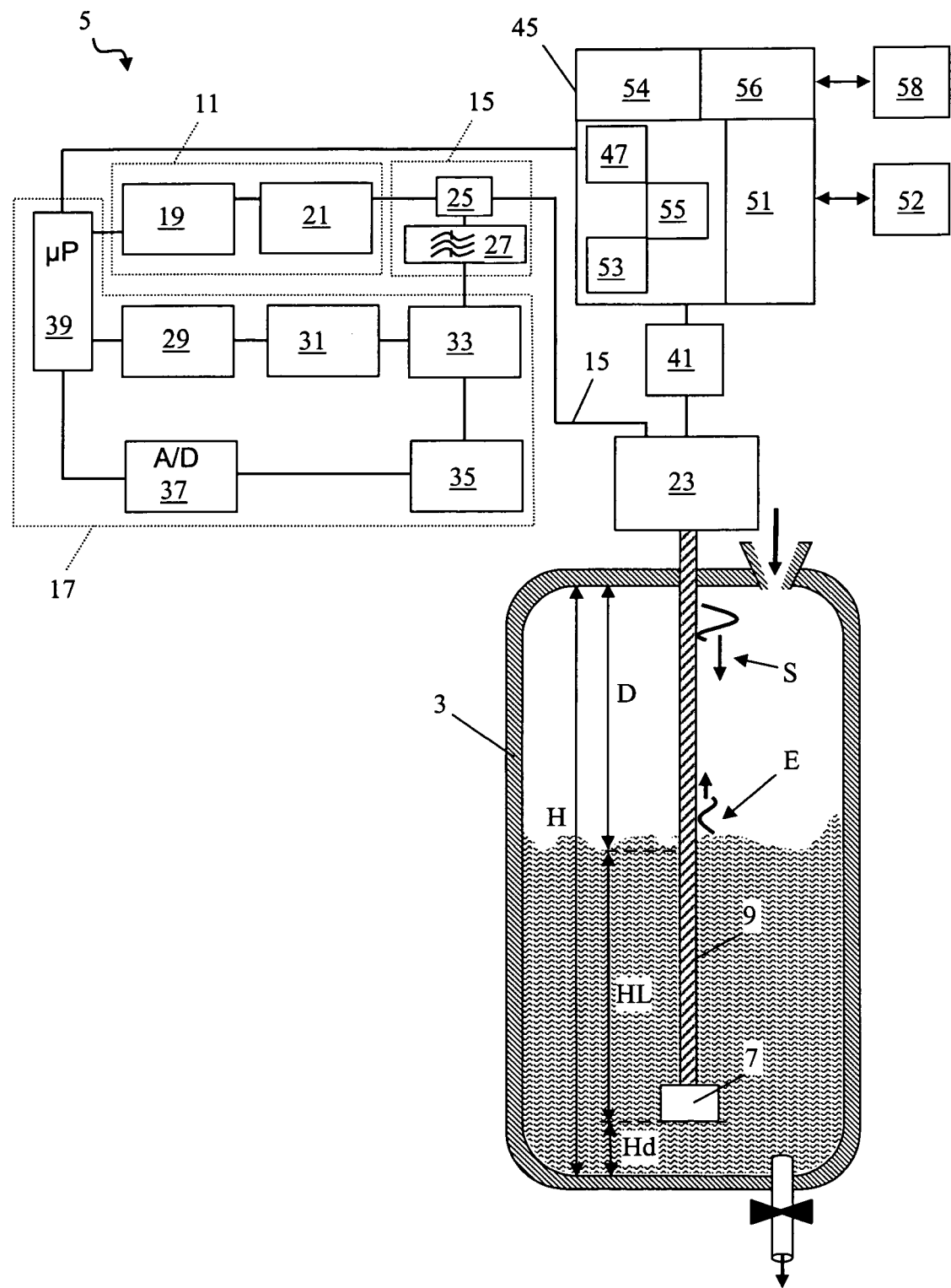
FIG. 1 shows a transmitter according to the invention.

FIG. 1 shows a transmitter according to the invention for measurement of mass, weight, volume, level and/or density of a product 1 in a vessel 3. The transmitter comprises a level sensor 5 and a pressure sensor 7.

The level sensor 5 is mounted on an opening located on top of the vessel 3. It comprises a conductive probe 9 that extends into the vessel 3. The probe 9 can for example be a rod or a cable extending into the vessel 3.

The level sensor 5 comprises means 11, 13 for generating and sending short electromagnetic pulses S down the probe 9, means for reception 15 of an echo E of the pulse reflected at a surface of the product 1 and means 17 for determining a time of flight needed for a pulse S to travel down the probe 9 and its echo E to return.

The means 11, 13 for generating and sending short electromagnetic pulses down the probe 9 comprise an internal clock 19 and a pulse generator 21. The internal clock 19 generates a pulse emission rate and supplies it to the pulse generator 21. Recent developments by the National Laboratory System now make it possible to generate fast, low power pulses, and time their return with very inexpensive circuits. See, for example, U.S. Pat. Nos. 5,345,471 and 5,361,070 assigned to The Regent of the University of California. The pulses generated by this new technology are broadband, and are not square wave pulses. In addition, the generated pulses have a very low power level. Such pulses are at a frequency of 100 MHz or higher and have an average power level of about 1 nano Watt or lower. Typical emission rates are for example several MHz.

The pulses S are supplied to the probe 9 via a coupling 23. They propagate down the probe 9, are reflected at the product surface and return to the coupling 23. From there they are supplied to the means 15 for reception of the echo E comprising a directional coupler 25 and a high pass-filter 27.

The filtered signal is supplied to the means 17 for determining the time of flight of the pulses.

These means 17 comprise a delay line 29. The delay line is connected to the clock 19 and produces a sampling rate that is equal to the pulse emission rate produced by the clock 19 delayed by a variable delay time.

The variable delay time varies for example according to a saw tooth function. The sampling rate is supplied to a sampling pulse generator 31, which in turn generates sampling pulses and provides them to a first input of a sample and hold circuit 33. Preferably sampling pulse generator 31 and pulse generator 21 are identical.

The filtered signals obtained by the means 15 for reception are supplied to a second input of the sample and hold circuit 33.

In operation short pulses S are sent periodically according to the pulse emission rate and their echo signals are supplied to the sample and hold circuit 33. The sample and hold circuit 33 superimposes a sampling pulse on every echo signal and the resulting signal is supplied to an amplifier 35. The amplified signal is digitalized by an analog to digital converter 37 connected in series to the amplifier 35. A digital output of the analog to digital converter 37 is supplied to a microprocessor 39.

The resulting signal is a measure for a correlation between the echo signal and the sampling pulse. Echo signals arrive periodically. They differ from the sampling pulses by the delay time, which increases according to the saw tooth function.

Assuming that consecutive echo signals are nearly identical, the sample and hold circuit 33 provides a stroboscopic recording of the echo signals. This assumption is generally correct, because the level inside the vessel essentially does not change between to consecutive pulses.

The microprocessor 39 is linked to the clock 19 and the sampling rate generator 29.

The microprocessor 39 regularly starts measurement cycles. During each measurement cycle, pulses S are generated and send periodically and their echoes E are received and corresponding echo signals are sampled as described above. A measurement cycle ends, when all delay times according to the saw tooth function were applied. The sampling values provided by the analog to digital converter 37 and the corresponding delay times are recorded. The sampling values as a function of the delay time show a distinct maximum at a delay time that is equal to the time of flight needed for the pulse to travel down the probe 9 and for its echo signal to return. This time of flight t is determined by the microprocessor 39.

The time of flight thus determined is proportional to the distance D between the coupling 23 and the surface of the product 1. Given a velocity v of propagation of the pulse along the probe and a distance H between the coupling 23 and a bottom of the vessel 3, the level L equals:

$$L = H - \tfrac{1}{2}(vt).$$

The pressure sensor 7 is mounted on the probe 9. Preferably, it is mounted on or near an end of the probe 9 near the bottom of the vessel 3. Sensor wiring can be run externally alongside the probe 9, incorporated under a protective shield surrounding the probe 9 or integrated inside the probe 9. The pressure sensor 7, for example a compact hydrostatic pressure sensor, produces an output proportional to a pressure p at its position near the bottom of the vessel 3. Hydrostatic pressure sensors generally consist of a membrane, which is mechanically or hydraulically connected to a transducer element, which can be based on inductive, capacitive, strain gauge or semiconductor principles. The pressure p is produced by a column of liquid of a height HL above the pressure sensor 7.

The pressure p depends on the height HL according to the following formula:

$$p = \rho g HL$$

wherein
ρ is an average density of the product
g is an acceleration due to gravity, and
HL is the height of the column.

Preferably, a signal-pre-processing and amplification unit is incorporated inside the pressure sensor 7 inside the vessel 3. Its output is provided to an electronic circuitry 41 for further processing.

In vessels 3 open to atmosphere, the surface of the product 1 is exposed to atmospheric pressure. Most pressure sensors 7 compensate for atmospheric pressure, such that the pressure p measured is equal to the difference between an absolute pressure at the location of the pressure sensor 7 and atmospheric pressure. For compensation purposes, a pressure compensation port 43 can be foreseen. The pressure compensation port 43 is connected to a sensing element of the pressure sensor 7. It is located above the level of the product 1. Preferably, it is integrated in the probe 9 near a top of the vessel 3. If the pressure inside the vessel 3 above the product 1 is greater than atmospheric pressure, an additional pressure sensor needs to be installed to measure a head pressure acting on the surface. In this case, the pressure acting on the surface is subtracted from the total pressure, leaving only the pressure p due to the column of the liquid in the vessel 3 above the pressure sensor 7.

The transmitter comprises a signal-processing unit 45 for determining mass M, weight W, volume V, level L and/or density ρ based on measurement signals supplied by the level sensor 5 and the pressure sensor 7. The supplied measurement signals are the pressure p and the time of flight t.

Given the pressure p and the time of flight t, mass M, weight W, volume V, level L and density ρ are calculated according to the following formulas:

Level L:

$$L = H - \tfrac{1}{2}(vt)$$

wherein
H is the distance between the coupling 23 and a bottom of the vessel 3,
v is the velocity of propagation of the pulse, and
t is the time of flight of the pulse.

Average density ρ:

$$\rho = p/(g\,HL)$$
$$= p/(g(L - Hd))$$

wherein
p is the pressure,
g is the acceleration due to gravity,
L is the level, and
Hd is a distance Hd between the pressure sensor 7 and the bottom of the vessel 3.

Mass M:

$$M = \rho A L$$
$$= p A L/(g(L - Hd))$$

wherein
p is the pressure of the column,
A is a crossectional area of vessel 3,
L is the level, g is the acceleration due to gravity,
L is the level, and
Hd is a distance Hd between the pressure sensor 7 and the bottom of the vessel 3.

Weight W:

$$W = g M$$
$$= p A L / (L - Hd)$$

wherein
p is the pressure of the column,
A is a crossectional area of vessel 3,
L is the level,
g is the acceleration due to gravity,
L is the level, and
Hd is a distance Hd between the pressure sensor 7 and the bottom of the vessel 3.

Volume V:

$$V = AL$$

wherein
A is a crossectional area of vessel 3, and
L is the level.

The signal-processing unit 45 is connected to the microprocessor 39 of the level sensor 5 and to the electronic circuitry 41 of the pressure sensor 7. It comprises one or more memories 47 for storing data related to the vessel 3 and/or the transmitter, software and/or measurement data.

In the embodiment shown, the pressure p and the time of flight t are supplied to the signal-processing unit 45 and it calculates mass M, weight W, volume V, level L and/or density p based on the pressure p, the time of flight t and the information stored in the memories. Alternatively, some of these calculations can be performed by the microprocessor 39 or the electronic circuitry 41.

Figure 2:
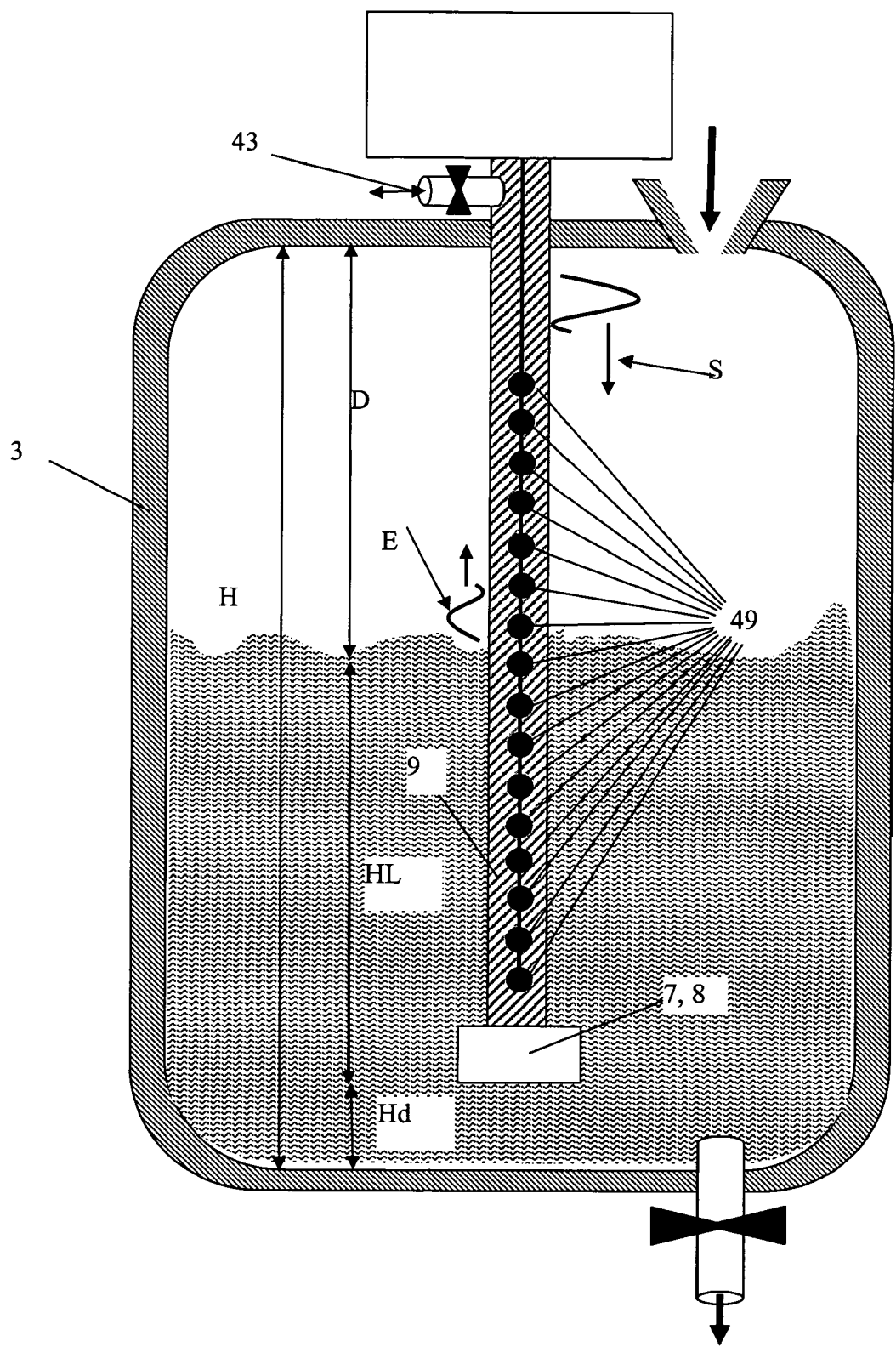
FIG. 2 shows the probe of the transmitter in FIG. 1, a pressure compensation port and temperature sensors.

In order to allow for temperature compensation, the sensor apparatus can comprise at least one temperature sensor 49. The temperature sensors 49 are integrated in the probe 9, as shown in FIG. 2, and supply temperature information to the signal processing unit 43. The temperature information can be supplied to the means 17 for determining the time of flight and to the electronic circuitry 41 to allow temperature compensation of the pressure p and the time of flight t to be measured. Alternatively, temperature compensation of the pressure p and the time of flight t, as well as temperature compensation of mass M, weight W, volume V, level L and density p can be performed by the signal-processing unit 45.

Preferably, the transmitter comprises a communication interface 51 for reception and/or delivery of information to or from a user, a supplier and/or a control unit 52.

In addition, the transmitter comprises a totalizer 53, for totalizing supplies and/or withdrawals of the product.

In the embodiment shown, the totalizer 53 is part of the signal-processing unit 45. The totalizer 53 tracks and stores every supply and withdrawal of product. The information gathered and stored by the totalizer is accessible via the communication interface 51. This allows inventory information to be obtained at any time. The transmitter provides this information in terms of mass M and/or volume V. Suppliers and users are therefore free to use whichever physical unit they prefer.

Supply and/or withdrawal information can be provided to billing and consignment operations to determine product usage out of the vessel 3 and product introduction into the vessel 3. This can for example be used to monitor mass transfer in a standalone tank with appropriate fill and withdrawal procedures. Reconciliation algorithms can be employed to reconcile the movement of incoming and outgoing product.

Information from the totalizer 53 can be combined with information received from or delivered to sources outside via the communications interface 51. The accuracy can be sufficient to use in place of input and output flow meters especially if part of a consigned bill-when-used contract program and/or when it is difficult or expensive to properly install and operate pipe-mounted flow meters.

Further, the transmitter comprises a monitor 55, for monitoring unauthorized supply or withdrawal of product and leakage. In the embodiment shown, the monitor 55 is part of the signal-processing unit 45. The monitor 55 surveys the inventory information and compares it with information on authorized supplies and/or withdrawals, which can be supplied via the communication interface 51. Monitoring can for example be performed by delivering mass information to statistical reconciliation algorithms. Preferably, this is done during quiescent periods. Whenever the product content of the vessels 3 changes without any authorization information being supplied to the monitor 55, the monitor 55 will issue a warning or an alarm.

The transmitter can be equipped with open fieldbus communication means, such as bus powered HART, Profibus, Foundation Fieldbus or Power over Ethernet (PoE) TCP/IP to report information and support remote servicing and asset management. Alternatively, means for wireless communication can be foreseen. Hard wiring of equipment is one of the significant costs of inventory measurement instrumentation. Instead of multiple level, pressure, temperature devices mounted individually on each vessel each with its own transceiver, the transmitter according to the invention requires only one opening and one transceiver. This reduces wiring and mounting costs.

In addition, the transmitter requires only one single power supply. The power needed by the level sensor 5, the pressure sensor 7 and the temperature sensors 49 to produce the information required is distributed within the transmitter. This allows to optimize power usage when required. Each sensor can be powered as needed to provide required information and optimize power usage. For example, during fill activities sample times can be increased when inventory changes are greater than a defined rate. During quiescent times sample times and times during which sensors are powered can be reduced. Inventory reporting can be on a periodic and/or exception basis. Battery, solar array, or fuel cell sources can be used making self powered wireless operation feasible.

In application, where the transmitter shall be mounted on a mobile vessel 3, or can be located in various different areas of an industrial site, the transmitter is preferably equipped with a device 54 for determining a physical position of the transmitter, for example a global positioning system (GPS). The device 54 can for example be linked to the signal processing unit 45, so that information about the physical position of the transmitter is accessible together with the measurement data.

Existing proprietary buses used within the petroleum industry such as Markspace, TIWAY and others can be used within the invention to eliminate external calculation devices.

In addition an integral server 56 can be provided within the transmitter, for supporting communication with at least one Information Technology Network 58.

The use of self-powered wireless network technologies allows one to add wireless multivariable measurement versions of the transmitter apparatus according to the invention one at a time to a tank farm parallel to an existing legacy proprietary bus. The legacy bus can be phased out when its installed base is displaced. Fuel cell, battery or solar power and TCP/IP wireless or other LAN or WAN wireless technologies can be used.

The transmitter provides integrally mounted sensing elements that can be installed and removed from the vessel 3 with out affecting the sides or bottom of the vessel 3. The individual pressure sensor 7, level sensor 5 and temperature sensors 49 are combined into one measurement device. Installation is similar to traditional top mounted mechanical/electronic instruments. Measurement devices mounted on the side or bottom of a tank are eliminated. The inventory measurement openings in the vessel 3 are reduced to one helping to eliminate potential emissions or leakage sources.

Figure 3:
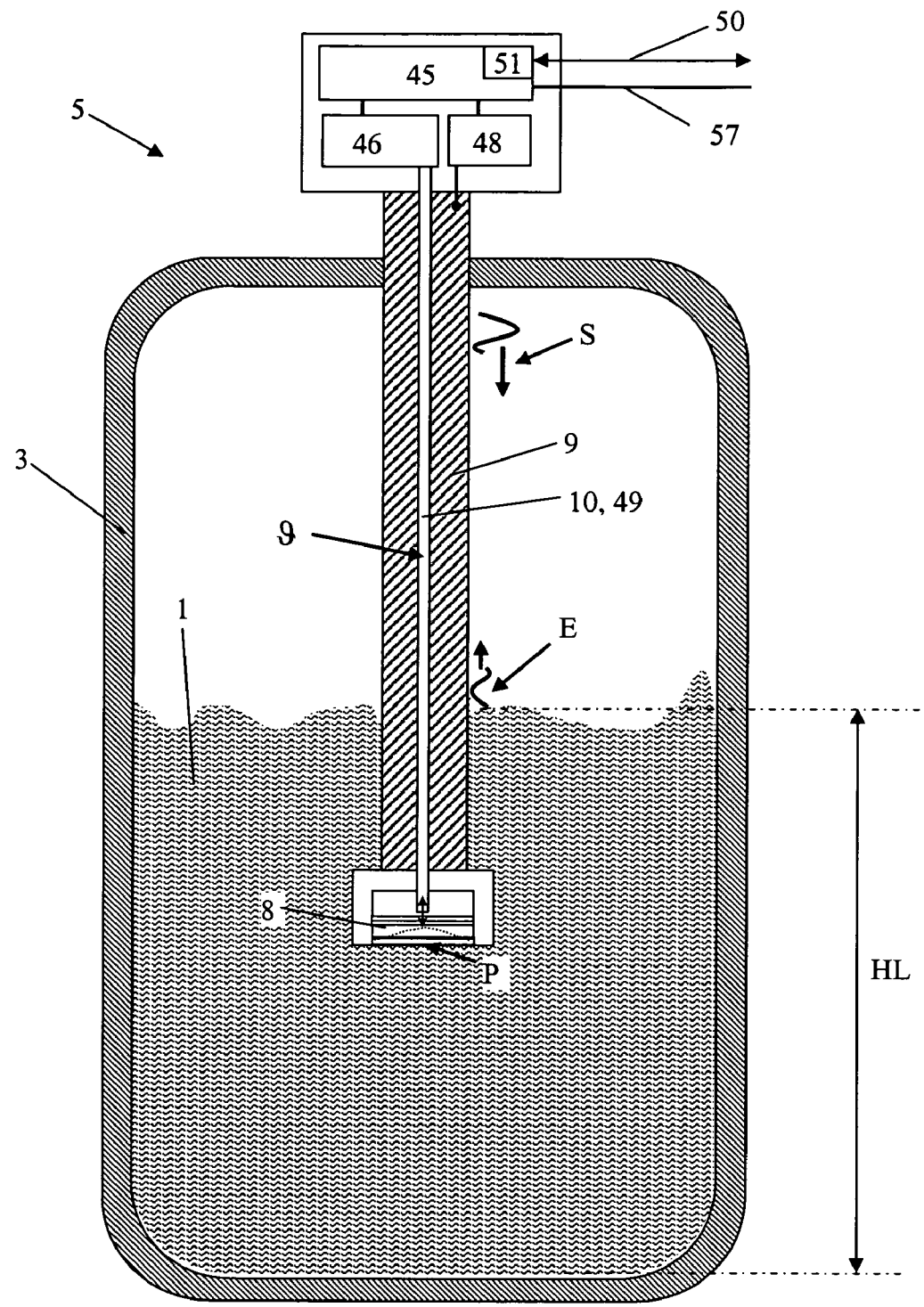
FIG. 3 shows a transmitter according to the invention with an optical temperature measurement unit and optical pressure measurement unit.

FIG. 3 shows a transmitter according to the invention for measurement of mass, weight, volume, level and/or density of a product 1 in a vessel 3. The transmitter comprises a level sensor 5, at least one optical fibre 10 as temperature φ sensor and an optically analysable pressure sensor 8 at the end of the probe 9.

The level sensor 5 is mounted on an opening located on top of the vessel 3. It comprises a conductive probe 9 that extends into the vessel 3. The probe 9 can for example be a rod or a cable extending into the vessel 3. In this case at least one optical fibre 10 is integrated into the probe 9. Such cables are available under the name Electro-Optical-Mechanical (EOM) cable or Electro-Optical-Mechanical Steel armored cable. The optical fibre 10 fulfills here two tasks, first of all the distributed temperature φ can be calculated along the length of optical fibre 10 or the probe 9 by a Raman Spectroscopy and on the other hand this optical fibre 10 is used for optical analysis of the optically analysing pressure sensor 8 at the end of the probe 9.

Optical fibre 10 distributed temperature sensors based on the Raman effect and enable the temperature φ profile along a length of the optical fibre 10 to be continuously monitored. The sensors operate on the optical time domain reflectometry (OTDR) principle whereby a pulse of light is transmitted down the optical fibre 10 and the light which is backscattered within the numerical aperture of the optical fibre 10 is measured. On this account a pulsed laser is coupled into the optical fibre 10 which is the sensing element. In the optical fibre 10 the photons interact with the molecules of the optical fibre material. Therefore, the laser light is scattered as the laser pulse propagates through the optical fibre material. Therefore, the laser light is scattered as the laser pulse propagates through the optical fibre 10 owing to change in density and composition of the optical fibre 10 as well as to molecular and bulk vibrations. Some of the photons are scattered backwards and detected by a fast photodetector. The spectrum of the backscattered light includes the Rayleigh, the Brillouin and the Raman backscattered light. The Raman backscattered light is caused by thermally influenced molecular vibrations. Consequently, the Raman backscattered light carries the information on the temperature φ of the optical fibre 10 and can be used to obtain information about the temperature φ distribution along the optical fibre 10. The Raman backscattering light has two components: the Stokes and the Anti-Stokes component. The Stokes component is only weakly dependent on temperature ρ, while the Anti-Stokes component shows a strong relation to temperature ρ. They can be separated from the primary and the Rayleigh backscattered light due to their differences in wavelength e.g. by a spectrometer. The ratio of the intensities of both components is calculated and transferred in temperature ρ values using the internal reference temperature of the equipment and an externally determined calibration function for the particular fibre type. Taking the ratio of these intensities of the Stokes and the Anti-Stokes components external influences such as fluctuations of the light source or age effects of the optical fibre 10 are eliminated.

$$Ia/Is=\{(n0+nk)4/(n0-nk)4\} \exp(-hcnk/kT)$$

Ia—intensity of Anti-Stokes-component
Is—intensity of Stokes-component
n0—light wave number
nk—shift of light wave number
h—Planck action quantum
c—velocity of the light within the optical fibre
k—Boltzmann-constant
T—temperature The time between sending the pulse of light or laser puls and detecting the backscattered signal provides a measure of the distance along the optical fibre 10 whilst the intensity of the Raman backscattered light or the number of the anti-Stokes photons provides the information on temperature φ.

The pressure P can be determined with an optical fibre 10 in at least two different kinds. In the first embodiment the sensor for pressure P measurement could be implemented using optical interferometry e.g. a Fabry-Perot pressure sensor 8 or Bragg-grating pressure sensors 8 which is show in FIG. 3. In this measurement principle the mirror cavity is constructed which is called a Fabry-Perot cavity. The Fabry-Perot cavity and the optical fibre 10 are both used as a sensing element. Fabry-Perot cavity-based sensors have been used to sense both pressure P and temperature φ. In principle this kind of sensor detect changes in the optical path length and a change in physical length of the cavity respectively induced either a change in the refractive index.

The second embodiment could be determined the sensor for pressure P measurement using an photoelastic effect of the optical fibre 10. Photoelasticity is the phenomena where stress or strain causes birefringence in optically transparent materials. Light is passed through the photoelastic medium. As the medium is stressed, the photoelastic medium effectively rotates the plane of polarization and hence the intensity of the light at the detector changes as a function of the applied force. In order to use the photoelastic effect for pressure measurement the optical fibre 10 must be applied on a pressure-sensitive diaphragm or pressure-sensitive membrane firmly. Due to the length variation in the optical fibre stress is caused.

Only one optical fibre can be used for measure the temperature profile along the length of the optical fibre 10 or the probe 9.

The procedure for the measuring of liquid level according to the Time Domain Reflectometry (TDR) method or guided microwave method was described in the description to FIG. 1 and is not explicit specified here.

The level measuring procedure is completely not influenced by the use of an optical measuring instrument for the measurement of the temperature and the pressure.

The above embodiment that the temperature φ can determined with an optical fibre 10 by a Raman Spectroscopy is not limited to the level measuring method of the guided microwave or Time Domain Reflectometry (TDR), but can also be integrated in other level measuring methods which uses a probe 9 e.g. capacitive level measuring methods.

1 product
3 vessel
5 level sensor
7 pressure sensor 8 optically analysing pressure sensor
9 probe
10 optical fibre
11 means for generating short electromagnetic pulses
13 means for sending short electromagnetic pulses
15 means for reception
17 means for determining a time of flight
19 internal clock
21 pulse generator
23 coupling
25 directional coupler
27 high pass filter
29 delay line
31 pulse generator
33 sample and hold circuit
35 amplifier
37 A/D converter
39 microprocessor
41 electronic circuitry
43 pressure compensation port
45 signal processing unit
46 optical analyzing unit
47 memory
48 electromagnetic analyzing unit
49 temperature sensor
50 field bus
51 communication interface
52 control unit
53 totalizer
54 device for determining a physical position
55 monitor
56 integral server
57 feeder
58 Information Technology Network

What is claimed is:

1. A transmitter for measurement of mass, weight, volume, level and/or density of a product in a vessel, comprising:
   a level sensor, comprising: a conductive probe extending into the vessel, means for generating and sending short electromagnetic pulses down the probe, means for reception of echoes of the pulses reflected at a surface of the product, and means for determining a time of flight needed for a pulse to travel down the probe and its echo to return;
   an optical fiber as a temperature sensor which is integrated in said conductive probe;
   at least one optically analysing pressure sensor, mounted on said conductive probe; and
   a signal processing unit for determining mass, weight, volume, level and/or density based on measurement signals supplied by said level sensor and said at least one optically analysing pressure sensor.

2. The transmitter according to claim 1, further comprising:
   a communication interface for reception and/or delivery of information to a user, a supplier and/or a control unit.

3. The transmitter according to claim 1, further comprising:
   a totalizer, for totalizing supplies or withdrawals of the product.

4. The transmitter according to claim 1, further comprising:
   a monitor, for monitoring unauthorized supply or withdrawal of product and leakage.

5. The transmitter according to claim 1, further comprising:
   a device for determining a physical position of the transmitter.

6. The transmitter according to claim 1, further comprising:
   an integral server for supporting communication with at least one Information Technology Network.

7. The transmitter according to claim 1, further comprising:
   a power supply to provide energy for said level sensor, said pressure sensor, said temperature sensor, said means for generating and sending, for reception of echoes and for determining a time of flight, and said signal processing unit.

* * * * *